(12) United States Patent
Furuya et al.

(10) Patent No.: US 6,376,963 B1
(45) Date of Patent: Apr. 23, 2002

(54) MINIATURE MOTOR AND METHOD FOR MANUFACTURING THE SAME

(75) Inventors: Kenji Furuya; Toshiya Yui; Kazuaki Takayama; Hiroshi Otsubo, all of Matsudo (JP)

(73) Assignee: Mabuchi Motor Co., LTD (JP)

( * ) Notice: Subject to any disclaimer, the term of this patent is extended or adjusted under 35 U.S.C. 154(b) by 0 days.

(21) Appl. No.: 09/545,702

(22) Filed: Apr. 6, 2000

(30) Foreign Application Priority Data

Apr. 7, 1999 (JP) .......................................... 11-099520

(51) Int. Cl.$^7$ ........................... H02K 11/06; H02K 1/24
(52) U.S. Cl. ........................ 310/269; 310/214; 310/216
(58) Field of Search ........................ 310/40 MM, 269, 310/261, 214, 216, 218; 29/598, 596

(56) References Cited

U.S. PATENT DOCUMENTS

| | | | |
|---|---|---|---|
| 4,730,136 A | * | 3/1988 | Muller ...................... 310/68 R |
| 4,859,895 A | * | 8/1989 | Morishita et al. ........... 310/261 |
| 4,881,002 A | * | 11/1989 | Yamaguchi ................. 310/261 |
| 4,902,941 A | * | 2/1990 | Merkle et al. .............. 310/216 |
| 5,045,742 A | * | 9/1991 | Armstrong et al. ......... 310/254 |

FOREIGN PATENT DOCUMENTS

JP          63-178746          7/1988

* cited by examiner

Primary Examiner—Elvin Enad
Assistant Examiner—Dang Dinh Le
(74) Attorney, Agent, or Firm—McGlew and Tuttle, P.C

(57) ABSTRACT

A miniature motor includes: a plurality of magnets serving as stator poles and attached to an inner surface of a motor casing having a closed-bottomed cylindrical shape; a salient-pole rotor having a core mounted on a rotor shaft and windings placed on the core; and a commutator mounted on the rotor shaft. The core includes a center portion having a hole formed therein at the center for engagement with the rotor shaft, a plurality of leg portions extending integrally and radially from the center portion in equal number with the salient poles, and a plurality of wing portions, each extending integrally and symmetrically from an end of each of the leg portions. The core comprises core laminations blanked from sheet steel and assembled together and is formed through deformation of the entire wing portions such that the radius of a circumcircle of the core coincides with a designed final radius of curvature of outer circumferential surfaces of the salient poles of the rotor.

2 Claims, 6 Drawing Sheets

3-POLE ROTOR

5-POLE ROTOR

MINIATURE MOTOR AND METHOD FOR MANUFACTURING THE SAME

BACKGROUND OF THE INVENTION

1. Field of the Invention

The present invention relates to a miniature motor having a rotor core structure which reduces cogging, and to a method for manufacturing the miniature motor.

2. Description of Related Art

There has been demand for miniature motors designed in such a manner so as to reduce cogging, for application to various fields, such as audio and video equipment. For example, a miniature motor used for driving a photo-pickup for use in an MD player or CD-ROM drive is required to reduce cogging in order to accurately control its stop position and to lower its starting voltage or current. Also, a motor for driving a printing head of a printer preferably has reduced cogging; otherwise, nonuniform printing may result.

In the case of a miniature motor having a rotor with salient poles, magnetic flux density varies greatly with rotation of the rotor. Specifically, the magnetic flux density at a certain point on the inner circumference of a stator changes greatly when a slot between core salients reaches the certain point and again changes greatly when a salient pole adjacent to the slot reaches the certain point, which results in generation of cogging. Conventionally, the slot between adjacent core salients is necessary for winding work and cannot be narrowed beyond a certain limit.

In order to facilitate such winding work, according to one known technique, ends of wing portions of a core are bent outward before winding work is performed (Japanese Patent Application Laid-Open (kokai) No. 63-178746). This technique will be described with reference to FIGS. 9 and 10. FIGS. 9 and 10 show a rotor core having three salient poles. FIG. 9 shows a state before completion of assembly—windings are placed on two core salients. FIG. 10 shows a state after completion of assembly—windings are placed on all of three core salients.

As shown in FIG. 9, before winding work is performed, end portions 24 and 25 of a circumferentially extending peripheral end (wing portion) of each of core salients 16, 17, and 18 are bent outward so as to expand a slot between the facing end portions 24 and 25 for convenience of winding work. After completion of winding work, as shown in FIG. 10, the bent end portions 24 and 25 of the wing portions of the core salients 16, 17, and 18 are restored to their original shapes. Thus, the peripheral portions of the core are all arranged along the circumference of the core.

Through use of this technique, winding work can be performed favorably and regularly. However it is not an easy process to bend outward the end portions 24 and 25 of the core salients 16, 17, and 18 and then restore the bent end portions 24 and 25 to their original shapes. Also, the accuracy of the technique is not sufficient for reducing cogging to a satisfactorily low level. Further, in order to plastically deform only the end portions 24 and 25, a "rest" must be disposed on the interior side of each wing portion of the core. However, in order to enable disposition of such a "rest" on the interior side of the wing portion, the number of turns of winding must be decreased to thereby secure a space for the rest. As a result, motor performance, such as torque, may become insufficient. In the case where the "rest" is not employed, the thickness of the end portions 24 and 25 must be rendered sufficiently thin as compared to that of the core salients 16, 17, and 18. However, employment of the thinner end portions 24 and 25 may impair a cogging-reducing effect.

SUMMARY OF THE INVENTION

An object of the present invention is to solve the above-mentioned problems involved in the conventional miniature motor and to provide a miniature motor having a rotor core structure which can reduce cogging and which can be machined with high accuracy.

Another object of the present invention is to provide a method for manufacturing the miniature motor.

To achieve the above object, the present invention provides a miniature motor comprising: a plurality of magnets serving as stator poles and attached to an inner surface of a motor casing having a closed-bottomed cylindrical shape; a salient-pole rotor having a core mounted on a rotor shaft and windings placed on the core; and a commutator mounted on the rotor shaft. The core includes a center portion having a hole formed therein at the center for engagement with the rotor shaft, a plurality of leg portions extending integrally and radially from the center portion in equal number with the salient poles, and a plurality of wing portions, each extending integrally and symmetrically from an end of each of the leg portions. The core includes core laminations blanked from sheet steel and assembled together. The core is deformed such that the radius of a circumcircle of the core coincides with a designed final radius of curvature of outer circumferential surfaces of the salient poles of the rotor.

Preferably, the width of each slot between adjacent wing portions is equal to or less than (core diameter/number of poles)×0.25.

Preferably, the width of each slot between adjacent wing portions is equal to or less than the diameter of a winding wire.

The present invention further provides a method for manufacturing a miniature motor, comprising the step of blanking core laminations from sheet steel. Each of the core laminations includes a center portion having a hole formed therein at the center for engagement with a rotor shaft, a plurality of leg portions extending integrally and radially from the center portion in equal number with the salient poles, and a plurality of wing portions, each extending integrally and symmetrically from an end of each of the leg portions. The radius of a circumcircle of each of the core laminations is greater than a designed final radius of curvature of outer circumferential surfaces of the salient poles of the rotor. The method further comprises the steps of: superposing the core laminations on each other to thereby obtain a laminated core; mounting the laminated core and a commutator on a rotor shaft; placing windings on the laminated core; and pressing the laminated core with windings from the radially outward direction by use of a forming jig having a pressing surface of a radius of curvature substantially equal to the designed final radius of curvature of outer circumferential surfaces of the salient poles of the rotor.

Thus, according to the present invention, the slot between adjacent wing portions is narrowed so as to reduce cogging of a miniature motor. Before winding work is performed, the entire wing portions of the core are opened (in distinction to the case of FIG. 9 where only wing end portions are opened), so that winding work is easy. After completion of winding work, the entire wing portions of the core are deformed, thereby adjusting the "winding shape" and narrowing the gap between windings. Thus, winding density becomes higher than that of the rotor of FIG. 10.

DESCRIPTION OF THE PREFERRED EMBODIMENTS

Embodiments of the present invention will next be described in detail with reference to the drawings.

Figure 1:
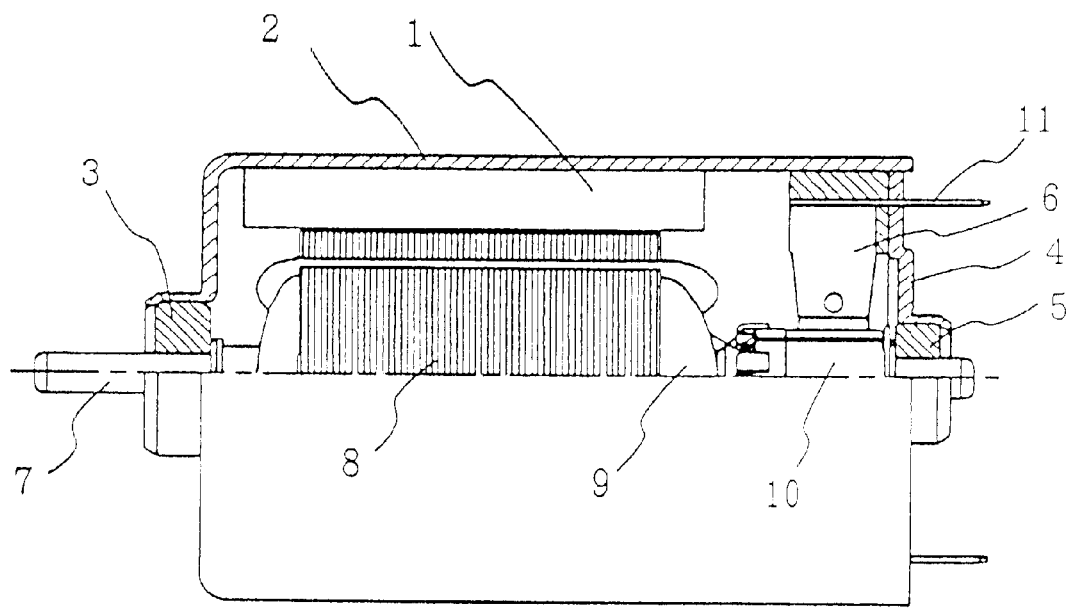
FIG. 1 is a longitudinal sectional view of a miniature motor employing a rotor core structure according to an embodiment of the present invention, sectionally showing the upper half of the motor.

FIG. 1 schematically shows a miniature motor employing a rotor core structure according to an embodiment of the present invention. The present invention is applicable to a miniature motor employing any number of stator poles and rotor poles. The miniature motor of FIG. 1 employs two stator poles and five rotor poles. Two magnets 1 serve as the respective stator poles. Windings 9 are placed on a core 8 to thereby form five salient poles, which serve as the rotor poles. Reference numeral 7 denotes a shaft, on which the rotor poles and a commutator 10 are mounted. The shaft 7 is rotatably supported by bearings 3 and 5. Reference numeral 2 denotes a motor casing, which is formed of a ferromagnetic material and into a closed-bottomed cylindrical shape. The bearing 3 is attached to a bottom portion of the motor casing 2. A casing cover 4 is fitted to an opening portion of the motor casing 2. The bearing 5 is attached to the casing cover 4 and is adapted to support brushes 6 and terminals 11 connected to the brushes 6.

The miniature motor of FIG. 1 assumes a conventional motor structure except for a rotor core structure, which will be described later. Current flows to the windings 9 of the rotor poles through the terminals 11, the brushes 6, and the commutator 10, thereby effecting motor rotation in a conventional manner. However, cogging is reduced as compared to a conventional motor.

Figure 2:
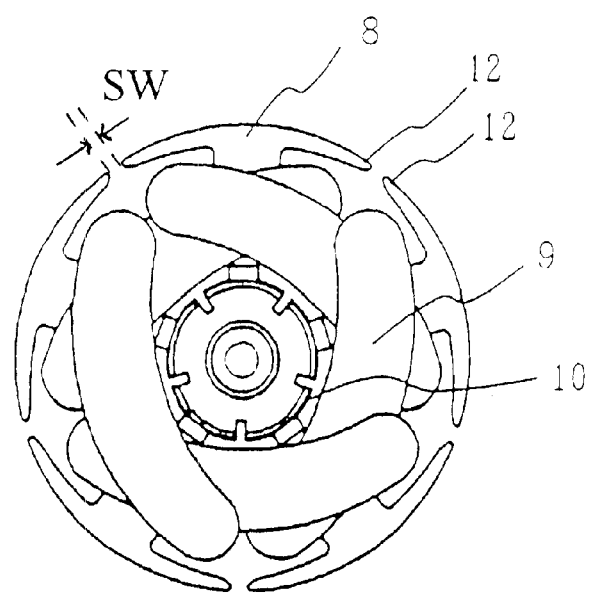
FIG. 2 is a view of the rotor shown in FIG. 1 as viewed from a commutator.

FIG. 2 shows the rotor shown in FIG. 1 as viewed from the commutator 10. The windings 9 are of a so-called multipolar-winding type. In the case of the 5-pole rotor shown in FIG. 2, the windings 9 are each placed on two poles. As will be described later, the present invention is characterized in that the slot formed between adjacent wing portions 12 of the core 8 is very narrow and is characterized by a method for manufacturing the core 8. From the viewpoint of reduction of cogging, the slot between the wing portions 12 is desirably rendered narrower. The width of the slot SW can be rendered substantially zero.

Figure 3:
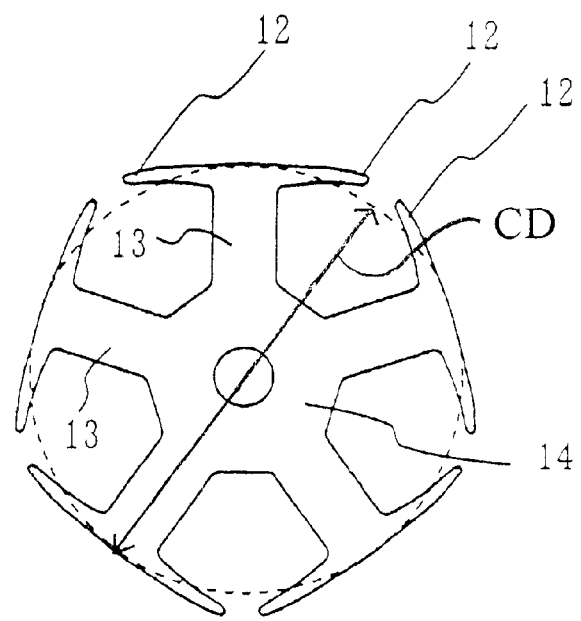
FIG. 3 is a view of a 5-pole core lamination blanked from a steel sheet.

FIG. 3 shows a 5-pole core lamination blanked from a silicon steel sheet. The core lamination includes a center portion 14 having a hole formed therein at the center for engagement with the shaft 7; a plurality of leg portions 13 extending integrally and radially from the center portion 14 in equal number with poles; and a plurality of wing portions 12, each extending integrally and symmetrically from an outer end of each of the leg portions 13. The outer circumferential surface of the wing portion 12 extends substantially straight, but is curved slightly. The outer circumferential surface of the wing portion 12 has a radius of curvature greater than that of a final profile of the core 8 as represented with a dashed line in FIG. 3. Accordingly, the slot between the ends of the adjacent wing portions 12 of the core lamination is greater than that of the completed core 8 shown in FIG. 2, thereby enabling efficient winding work performed through mechanization. For enabling the winding work, the slot between the ends of the adjacent wing portions 12 of the core lamination must be greater than the diameter of a winding wire (for example, 0.06 mm to 1 mm).

The core laminations to be united into the laminated core 8 have a special profile as shown in FIG. 3. The outer circumferential surfaces of the wing portions 12 do not coincide with a circle which is concentric with a rotor shaft. However, such a special profile can be formed through conventional blanking from a silicon steel sheet.

Figure 4:
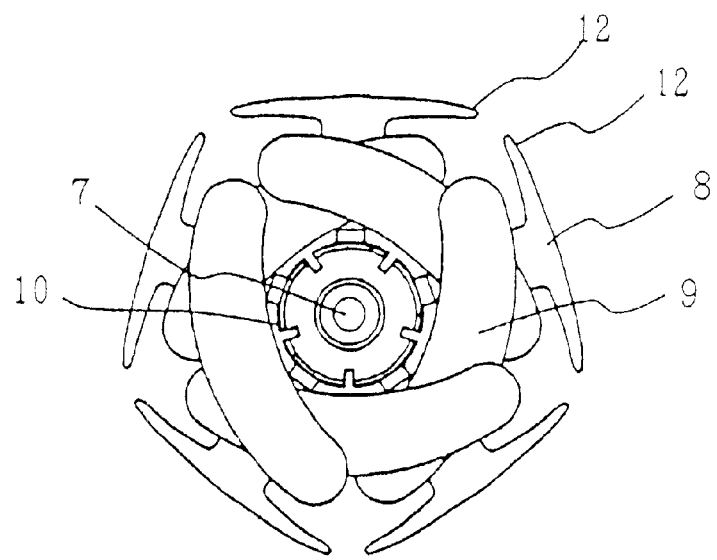
FIG. 4 is a view of a laminated core on which windings are placed, showing a state before undergoing finish-forming.

FIG. 4 shows a state as observed after performing the steps of superposing the core laminations of FIG. 3 on each other to obtain the laminated core 8; mounting the laminated core 8 and the commutator 10 on the shaft 7; and placing windings on the laminated core 8. The outer circumferential surface of the laminated core 8 of FIG. 4 does not coincide with a circle which is concentric with the shaft 7; i.e., rotor poles are uncompleted.

Figure 5:
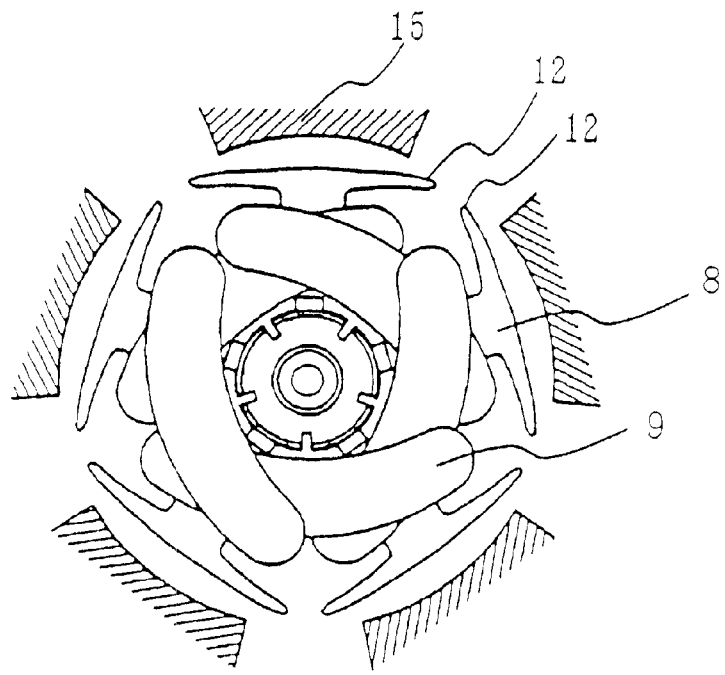
FIG. 5 is a view showing forming jigs for forming uncompleted rotor poles shown in FIG. 4 into final rotor poles.

The uncompleted rotor poles shown in FIG. 4 undergo finish-forming, which is performed by use of a forming jig 15 shown in FIG. 5. The inner circumferential surface of the forming jig 15 comes into contact with the outer circumferential surface of a core salient and has a radius of curvature substantially equal to that to be attained. In this case, in order to finish five salient poles, five forming jigs 15 are simultaneously pressed against the corresponding core salients from the radially outward direction so as to deform the outer circumferential surfaces of the core salients into a circular form. Thus, the rotor having five salient poles shown in FIG. 2 is completed.

Figure 6:
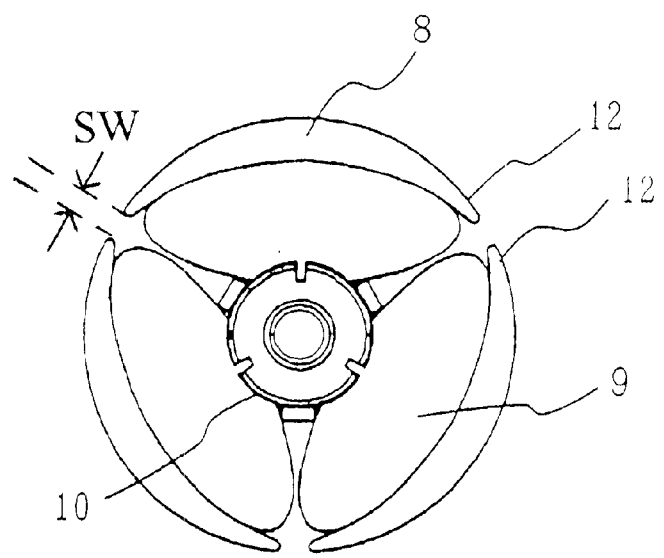
FIG. 6 is a view of a completed rotor having three salient poles as viewed from a commutator.

FIG. 6 shows a completed rotor having three salient poles as viewed from a commutator 10. Reference numeral 8 denotes a laminated core, and reference numeral 12 denotes wing portions of the laminated core 8. The rotor is characterized in that the slot between the adjacent wing portions 12 is narrowed.

Figure 7:
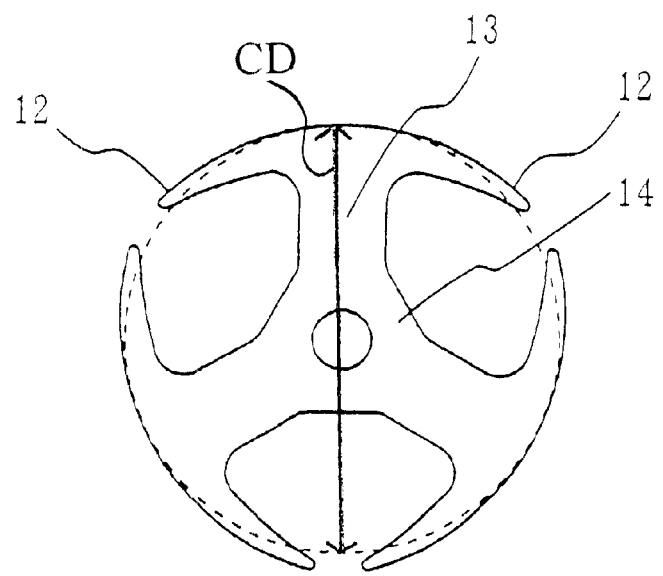
FIG. 7 is a view of a 3-pole core lamination blanked from a steel sheet.

FIG. 7 shows a 3-pole core lamination blanked from a silicon steel sheet. The core lamination includes a center portion 14 having a hole formed therein at the center for engagement with the shaft 7; a plurality of leg portions 13 extending integrally and radially from the center portion 14 in equal number with poles; and a plurality of wing portions 12, each extending integrally and symmetrically from an outer end of each of the leg portions 13. The core has a core diameter CD. The outer circumferential surface of the wing portion 12 is curved slightly. The outer circumferential surface of the wing portion 12 has a radius of curvature greater than that of a final profile of the core 8 as represented with a dashed line in FIG. 7. Accordingly, the slot between the ends of the adjacent wing portions 12 of the core lamination is greater than that of the completed core 8 shown in FIG. 6. For enabling winding work, the slot between the ends of the adjacent wing portions 12 of the core lamination must be greater than the diameter of a winding wire.

Figure 8:
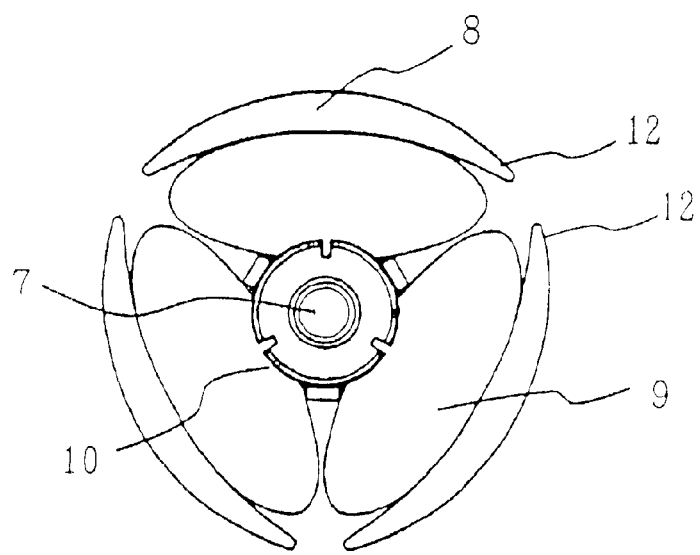
FIG. 8 is a view of a laminated core on which windings are placed, showing a state before undergoing finish-forming.
Figure 9:
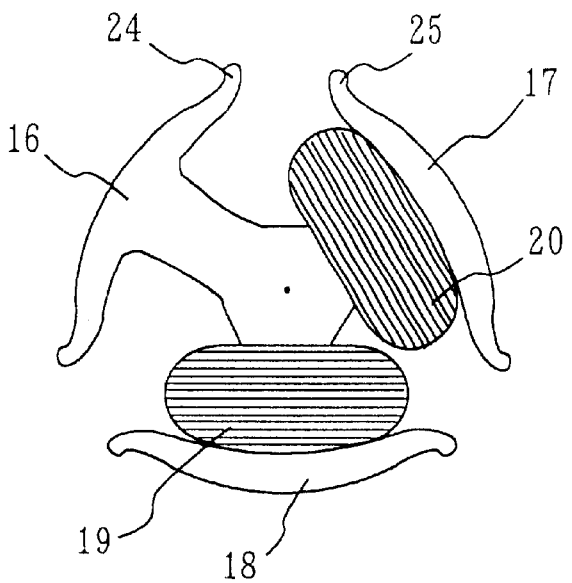
FIG. 9 is a view of a conventional uncompleted 3-pole core, showing a state before undergoing finish-forming.
Figure 10:
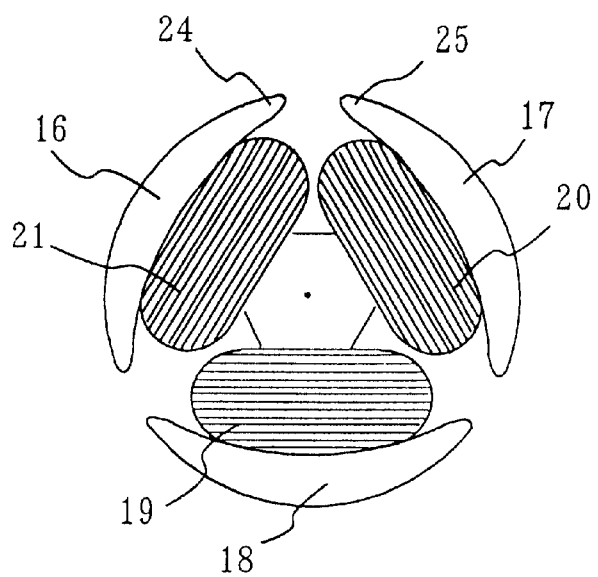
FIG. 10 is a view of a conventional completed 3-pole core, showing a state after the uncompleted 3-pole core of FIG. 9 has undergone finish-forming.

FIG. 8 shows a state as observed after performing the steps of superposing the core laminations of FIG. 7 on each other to obtain the laminated core 8; mounting the laminated core 8 and the commutator 10 on the shaft 7; and placing windings on the laminated core 8. The outer circumferential surface of the laminated core 8 of FIG. 8 does not coincide with a circle which is concentric with the shaft 7; i.e., rotor poles are uncompleted. As in the case of the rotor having five uncompleted poles shown in FIG. 5, the uncompleted rotor poles shown in FIG. 8 undergo finish-forming, which is performed by use of a forming jig. In this case, in order to finish three salient poles, three forming jigs are simultaneously pressed against the corresponding core salients from the radially outward direction so as to deform the outer circumferential surfaces of the core salients into a circular form. Thus, the rotor having three salient poles shown in FIG. 6 is completed.

Figure 11:
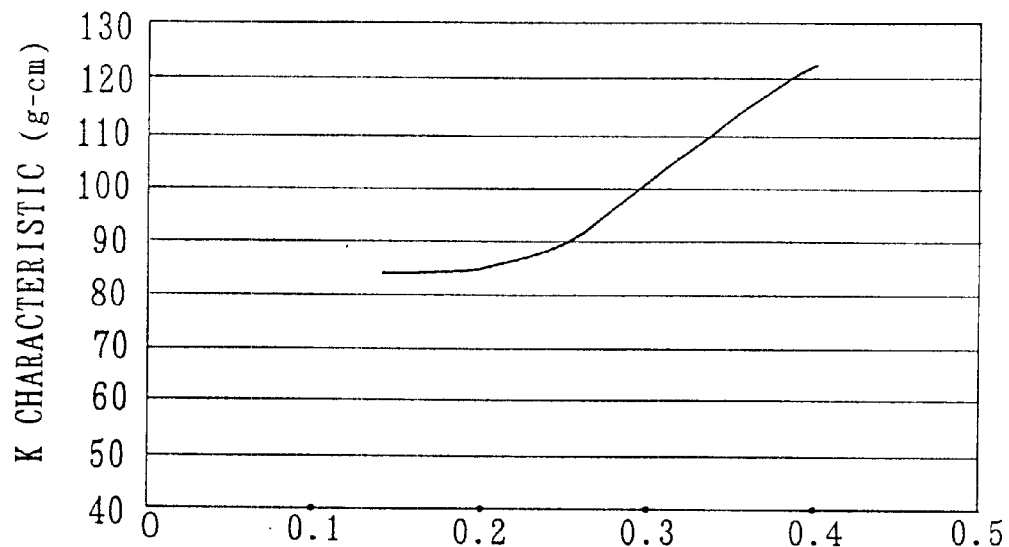
FIG. 11 is a graph showing the relationship between a core slot width and a cogging torque characteristic (K characteristic) with respect to a 3-pole rotor.
Figure 12:
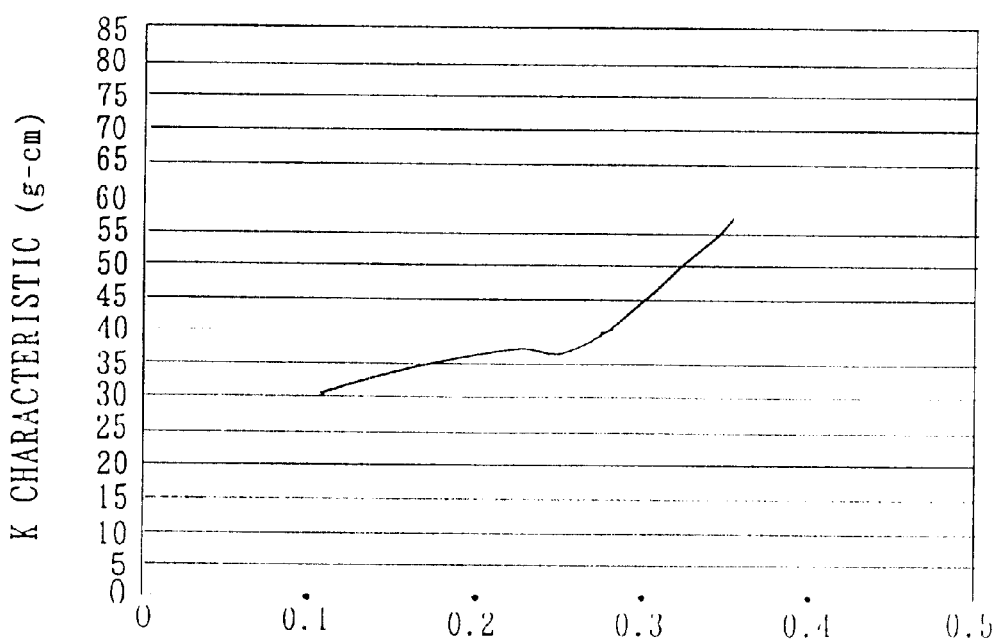
FIG. 12 is a graph showing the relationship between a core slot width and a cogging torque characteristic (K characteristic) with respect to a 5-pole rotor.

FIGS. 11 and 12 show the relationship between a core slot width and a cogging torque characteristic (K characteristic) with respect to a 3-pole rotor and a 5-pole rotor, respectively. The core slot width can be represented by the formula "(core diameter/number of poles)×A (coefficient)." The coefficient A is read along the axis of abscissa in the graphs of FIGS. 11 and 12. As seen from the graphs of FIGS. 11 and 12, as the slot width becomes narrower, the cogging torque decreases. Particularly, at an A value of 0.25, the cogging torque decreases greatly. As mentioned previously, no problem occurs even when the slot width is decreased to substantially zero.

In the miniature motor of the present invention, the core composed of core laminations blanked from sheet steel and assembled together is deformed such that the radius of curvature of the outer circumferential surface of the core coincides with the designed final radius of curvature of outer circumferential surfaces of the salient poles of the rotor. Therefore, the core can be machined accurately and easily. Further, since the width of a slot between adjacent wing portions can be reduced, cogging of the miniature motor can be reduced.

What is claimed is:

1. A miniature motor comprising:

a plurality of magnets serving as stator poles and attached to an inner surface of a motor casing having a closed-bottomed cylindrical shape;

a salient-pole rotor having a core mounted on a rotor shaft and windings placed on the core, the core including a center portion having a hole formed therein at a center for engagement with the rotor shaft, a plurality of leg portions extending integrally and radially from the center portion in equal number with the salient poles, and a plurality of wing portions, each extending integrally and symmetrically from an end of each of the leg portions, the core comprising core laminations blanked from sheet steel and assembled together and is formed through deformation of the entire wing portions such that a radius of a circumference the core coincides with a designed final radius of curvature of outer circumferential surfaces of the salient poles of the rotor with each slot between adjacent wing portions having a width equal to or less than 0.25 times the result of the core diameter divided by the number of poles; and a commutator mounted on the rotor shaft.

2. A miniature motor according to claim 1, wherein each slot between adjacent wing portions has a width equal to or less than a diameter of a winding wire.

\* \* \* \* \*